United States Patent
Dong et al.

(10) Patent No.: US 10,867,511 B2
(45) Date of Patent: Dec. 15, 2020

(54) APPARATUS AND METHOD FOR IDENTIFYING LICENSE PLATE TAMPERING

(71) Applicant: BOE TECHNOLOGY GROUP CO., LTD., Beijing (CN)

(72) Inventors: Wenchu Dong, Beijing (CN); Hongtao Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 140 days.

(21) Appl. No.: 15/920,572

(22) Filed: Mar. 14, 2018

(65) Prior Publication Data
US 2019/0080594 A1    Mar. 14, 2019

(30) Foreign Application Priority Data
Sep. 13, 2017    (CN) .......................... 2017 1 0821169

(51) Int. Cl.
| | | |
|---|---|---|
| *G08G 1/017* | (2006.01) | |
| *G06K 9/62* | (2006.01) | |
| *G06K 9/32* | (2006.01) | |
| *G06T 5/00* | (2006.01) | |

(52) U.S. Cl.
CPC .......... *G08G 1/0175* (2013.01); *G06K 9/3258* (2013.01); *G06K 9/6201* (2013.01); *G06K 2009/6213* (2013.01); *G06K 2209/01* (2013.01); *G06K 2209/15* (2013.01); *G06T 5/003* (2013.01)

(58) Field of Classification Search
CPC .............. G08G 1/0175; G06K 9/6201; G06K 2009/6213; G06K 2209/01; G06K 2209/15; G06T 5/003
See application file for complete search history.

(56) References Cited

U.S. PATENT DOCUMENTS

| | | | | |
|---|---|---|---|---|
| 5,831,669 A | * | 11/1998 | Adrain ...................... | G06K 9/00 348/143 |
| 8,887,421 B1 | * | 11/2014 | Halula .................... | G09F 11/02 40/503 |
| 8,937,660 B2 | * | 1/2015 | Nerayoff .................. | G06K 9/00 348/148 |
| 9,053,633 B2 | * | 6/2015 | Breed .................. | G08G 1/0175 |
| 9,171,382 B2 | * | 10/2015 | Nerayoff ................ | G08G 1/054 |
| 9,363,357 B2 | * | 6/2016 | Hansen .............. | G06K 9/00536 |

(Continued)

FOREIGN PATENT DOCUMENTS

| | | |
|---|---|---|
| CN | 202033899 U | 11/2011 |
| CN | 102682608 A | 9/2012 |

OTHER PUBLICATIONS

Office Action dated Apr. 22, 2019 issued in corresponding Chinese Application No. 201710821169.7.

*Primary Examiner* — Mia M Thomas
(74) *Attorney, Agent, or Firm* — Nath, Goldberg & Meyer; Joshua B. Goldberg

(57) ABSTRACT

The present disclosure provides an apparatus for identifying license plate tampering. The apparatus comprises: an image obtainer configured to obtain a vehicle image and then obtain and send a license plate number image within the vehicle image; and a first identifier configured to receive the license plate number image and determine whether the license plate of the vehicle is tampered according to the received license plate number image and a preset standard license plate number image.

16 Claims, 1 Drawing Sheet

(56) References Cited

U.S. PATENT DOCUMENTS

| | | | | |
|---|---|---|---|---|
| 9,886,851 | B2* | 2/2018 | Lin | H04L 12/6418 |
| 9,990,376 | B2* | 6/2018 | Voeller | H04N 5/232 |
| 10,397,089 | B2* | 8/2019 | Dorum | G08G 1/052 |
| 10,521,665 | B2* | 12/2019 | Nerayoff | H04N 7/181 |
| 10,726,718 | B1* | 7/2020 | Lyles | G06K 9/325 |
| 2013/0279758 | A1* | 10/2013 | Burry | G06K 9/3258 |
| | | | | 382/105 |
| 2015/0054639 | A1* | 2/2015 | Rosen | G06K 9/00785 |
| | | | | 340/439 |
| 2015/0312400 | A1* | 10/2015 | Hansen | H04M 1/72547 |
| | | | | 455/414.1 |
| 2016/0034778 | A1* | 2/2016 | Wang | G06K 9/00785 |
| | | | | 382/105 |
| 2016/0078759 | A1* | 3/2016 | Nerayoff | H04N 5/23203 |
| | | | | 701/3 |
| 2016/0098610 | A1* | 4/2016 | Prakash | G06K 9/00791 |
| | | | | 348/148 |
| 2016/0300119 | A1* | 10/2016 | Silva | G06F 16/2228 |
| 2017/0372143 | A1* | 12/2017 | Barcus | G06F 7/10 |
| 2017/0372161 | A1* | 12/2017 | Almeida | G06K 9/00785 |

\* cited by examiner

APPARATUS AND METHOD FOR IDENTIFYING LICENSE PLATE TAMPERING

CROSS-REFERENCE TO RELATED APPLICATION

The present application claims the priority of China patent application No. 201710821169.7 submitted to the China Intellectual Property Office on Sep. 13, 2017, the disclosure of which is incorporated herein in its entirety by reference.

TECHNICAL FIELD

This disclosure relates to the technical field of vehicle safety driving, and particularly relates to an apparatus and method for identifying license plate tampering.

BACKGROUND OF THE INVENTION

The current intelligent traffic violation surveillance and management system can automatically identify partially or entirely blocked license plate numbers. Specifically, the system identifies a vehicle with a blocked license plate number by obtaining a license plate positioning image, identifying the license plate number therein, and determining whether the license plate number is blocked. However, the current intelligent traffic violation surveillance and management system cannot identify a license plate with a tampered number or letter.

Therefore, there is an urgent need for a solution of identifying license plate tampering which can solve the above technical problem.

SUMMARY

The present disclosure has been accomplished in order to at least partially solve the problems in the prior art. The present disclosure provides an apparatus and method for identifying license plate tampering that is capable of automatically identifying license plate number tampering.

According to one aspect of the disclosure, there is provided an apparatus for identifying license plate tampering, comprising:

an image obtainer configured to obtain a vehicle image and then obtain and send a license plate number image within the vehicle image; and a first identifier configured to receive the license plate number image and determine whether the license plate of the vehicle is tampered according to the received license plate number image and a preset standard license plate number image.

The first identifier may be configured to divide the license plate number image into different regions according to characters, compare a color, form and texture of a character in each of the regions with a color, form and texture of a character in the preset standard license plate number image, determine the license plate of the vehicle to be a tampered plate when at least one of the color, form and texture of the character in any of the regions is different from the corresponding at least one of the color, form and texture of the character in the standard license plate number image, and determine the license plate of the vehicle to be a normal plate when all of the color, form and texture of the character in each of the regions are the same with the color, form and texture of the character in the standard license plate number image.

The apparatus for identifying license plate tampering may further comprise a second identifier, the image obtainer is further configured to send the vehicle image to the second identifier;

the second identifier is configured to determine whether a vehicle information contained in the vehicle image is consistent with a standard vehicle information in a vehicle information base, and to send a first identification command to the first identifier when the vehicle information contained in the vehicle image is not consistent with the standard vehicle information in the vehicle information base; and the first identifier is configured to determine whether the license plate is tampered according to the received license plate number image and the preset standard license plate number image after receiving the first identification command.

The vehicle information and the standard vehicle information may include a license plate number, a color and a vehicle type; and the second identifier is configured to send the first identification command to the first identifier when at least one of the color and the vehicle type of the vehicle information contained in the vehicle image is not consistent with the corresponding at least one of the color and the vehicle type in the standard vehicle information of the same license plate number in the vehicle information base.

The vehicle information base may store a standard vehicle image, and the second identifier is configured to match the vehicle image to the standard vehicle image in the vehicle information base.

The standard vehicle information in the vehicle information base may be text information;

the image obtainer is further configured to extract vehicle information in the form of text contained in the vehicle image according to the vehicle image, and send the vehicle information in the form of text contained in the vehicle image to the second identifier; and the second identifier is configured to match the vehicle information in the form of text contained in the vehicle image within the vehicle information base.

The apparatus for identifying license plate tampering may further comprise an image processor, the image obtainer is further configured to send the vehicle image to the image processor when the vehicle information is unable to be extracted according to the vehicle image; and the image processor is configured to sharpen the vehicle image, and send the sharpened vehicle image to the image obtainer so that the image obtainer extracts vehicle information from the sharpened vehicle image.

The apparatus for identifying license plate tampering may further comprise a third identifier, the image obtainer is further configured to send the license plate number image to the third identifier;

the third identifier is configured to determine whether the license plate is blocked according to the license plate number image, and send a second identification command to the second identifier when the license plate of the vehicle is determined to be not blocked; and the second identifier is further configured to determine whether the vehicle information contained in the vehicle image is consistent with the standard vehicle information in the vehicle information base after receiving the second identification command.

The apparatus for identifying license plate tampering may further comprise an alarm, the alarm alarms a worker around the vehicle when the first identifier determines that the license plate of the vehicle is tampered.

According to another aspect of the disclosure, there is provided a method for identifying license plate tampering, which comprises the steps of:

obtaining a vehicle image, and then obtaining a license plate number image in the vehicle image; and determining whether the license plate of the vehicle is tampered according to the license plate number image and a preset standard license plate number image.

The step of determining whether the license plate of the vehicle is tampered according to the license plate number image and the preset standard license plate number image may comprise:

dividing the license plate number image into different regions according to characters; and comparing a color, form and texture of a character in each of the regions with a color, form and texture of a character in the preset standard license plate number image, determining the license plate of the vehicle to be a tampered plate when at least one of the color, form and texture of the character in any of the regions is different from the corresponding at least one of the color, form and texture of the character in the standard license plate number image, and determining the license plate of the vehicle to be a normal plate when the color, form and texture of the character in each of the regions are the same with the color, form and texture of the character in the standard license plate number image.

Before the step of determining whether the license plate of the vehicle is tampered according to the license plate number image and the preset standard license plate number image, the method may further comprise the step of:

determining whether a vehicle information contained in the vehicle image is consistent with a standard vehicle information in a vehicle information base, and determining whether the license plate of the vehicle is tampered according to the license plate number image and the preset standard license plate number image when the vehicle information contained in the vehicle image is not consistent with the standard vehicle information in the vehicle information base.

The vehicle information and the standard vehicle information may include a license plate number, a color and a vehicle type; and the vehicle information contained in the vehicle image being not consistent with the standard vehicle information in the vehicle information base includes a case where at least one of the color and the vehicle type of the vehicle information contained in the vehicle image is not consistent with the corresponding at least one of the color and the vehicle type in the standard vehicle information of the same license plate number in the vehicle information base.

The vehicle information base may store a standard vehicle image therein, and determining whether the vehicle information contained in the vehicle image is consistent with the standard vehicle information in the vehicle information base includes matching the vehicle image to the standard vehicle image in the vehicle information base.

The standard vehicle information in the vehicle information base may be text information;

after the step of obtaining the license plate number image in the vehicle image, the method further includes extracting vehicle information in the form of text contained in the vehicle image according to the vehicle image, and the step of determining whether the vehicle information contained in the vehicle image is consistent with the standard vehicle information in the vehicle information base includes matching the vehicle information in the form of text contained in the vehicle image within the vehicle information base.

The method may further comprise:

sharpening the vehicle image when vehicle information is unable to be extracted from the vehicle image, and extracting vehicle information from the sharpened vehicle image.

After the step of obtaining the license plate number image from the vehicle image and before the step of determining whether the vehicle information contained in the vehicle image is consistent with the standard vehicle information in the vehicle information base, the method may further include the step of:

determining whether the license plate is blocked according to the license plate number image, and determining whether the vehicle information contained in the vehicle image is consistent with the standard vehicle information in the vehicle information base when the license plate of the vehicle is determined to be not blocked.

The method may further comprise:

alarming a worker around the vehicle when the license plate of the vehicle is determined to be tampered.

DETAILED DESCRIPTION

Hereinafter, the exemplary embodiments of the present disclosure will be clearly and completely described with reference to the accompanying drawings. Apparently, the described exemplary embodiments are only some but not all of the embodiments of the present disclosure. All other embodiments obtained by those of ordinary skill in the art based on the exemplary embodiments of the present disclosure without making any creative effort shall fall within the protection scope of the present disclosure.

Figure 1:
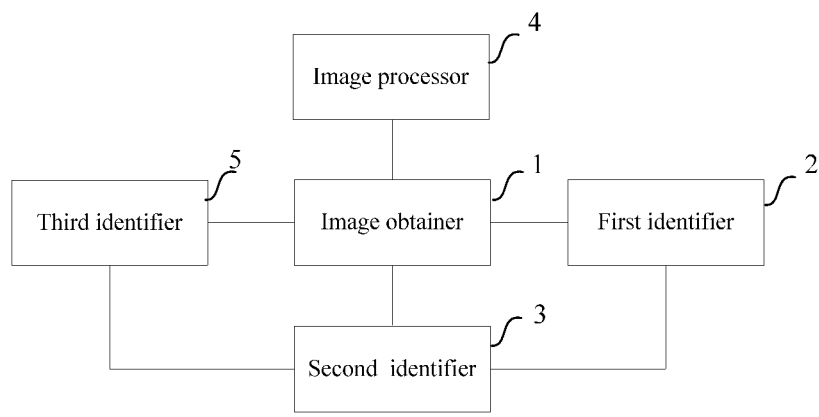
FIG. 1 is an schematic view showing a configuration of the apparatus for identifying license plate tampering according to an exemplary embodiment of the disclosure.

According to one aspect of the disclosure, there is provided an apparatus for identifying license plate tampering. As shown in FIG. 1, the apparatus for identifying license plate tampering includes an image obtainer 1 and a first identifier 2. The image obtainer 1 is configured to obtain a vehicle image and then obtain a license plate number image within the vehicle image and send the license plate number image to the first identifier 2. The first identifier 2 is configured to determine whether the license plate of the vehicle is tampered according to the license plate number image and a preset standard license plate number image. In an exemplary embodiment of the disclosure, the image obtainer may be a camera such as a CCD or COMS camera. However, the image obtainer of the disclosure is not limited thereto, but may also be any other device that can capture an image. In addition, in an exemplary embodiment of the disclosure, the first identifier may be implemented as a DSP chip or an embedded chip. However, the first identifier of the disclosure is not limited thereto, but may also be any other device or identification circuit that can compare a captured image with a standard license plate number image.

It should be noted that a road camera captures a vehicle image and sends the vehicle image to the image obtainer 1 which is capable of identifying a license plate region of the vehicle image and thus obtains a license plate image. The apparatus for identifying license plate tampering may be integrated with the current intelligent traffic violation surveillance and management system.

By obtaining a vehicle image and then obtaining an license plate number image therein, and determining whether the license plate of the vehicle is tampered according to the license plate number image and a preset standard license plate number image, the apparatus for identifying license plate tampering of the disclosure realizes automatic identification of a tampered license plate number without human laboring, thus saving time and labor, reducing human cost, and further improving precision and reliability in identification of tampered license plates.

The first identifier 2 is provided with standard license plate number images of various vehicles therein, and is configured to divide the license plate number image into different regions according to characters, compare a color, form and texture of a character in each of the regions with a color, form and texture of a character in the preset standard license plate number image, determine the license plate of the vehicle to be a tampered plate when at least one of the color, form and texture of the character in any of the regions is different from the corresponding at least one of the color, form and texture of the character in the standard license plate number image, and determine the license plate of the vehicle to be a normal plate when all of the color, form and texture of the character in each of the regions are the same with the color, form and texture of the character in the standard license plate number image.

It should be noted that when determining that at least one of the color, form and texture of the character in any of the regions of the license plate number image is different from the corresponding at least one of the color, form and texture of the character in the standard license plate number image, the first identifier 2 may not determine the license plate of the vehicle to be a tampered license plate temporarily, but allows for further identification by human so as to further improve reliability.

In the exemplary embodiment of the disclosure, the apparatus for identifying license plate tampering may further comprise a second identifier 3. Correspondingly, the image obtainer 1 is further configured to send the vehicle image to the second identifier 3.

The second identifier 3 is configured to determine whether a vehicle information contained in the vehicle image is consistent with a standard vehicle information in a vehicle information base, and send a first identification command to the first identifier 2 when the vehicle information contained in the vehicle image is not consistent with the standard vehicle information in the vehicle information base. The first identifier 2 is configured to determine whether the license plate is tampered according to the received license plate number image and the preset standard license plate number image after receiving the first identification command. In an exemplary embodiment of the disclosure, the second identifier may be implemented as a DSP chip or an embedded chip. However, the second identifier of the disclosure is not limited thereto, but may also be any other device or comparison circuit that can compare the extracted vehicle information with the standard vehicle information in the vehicle information base.

In an exemplary embodiment of the disclosure, the vehicle information and the standard vehicle information include a license plate number, a color and a vehicle type. The second identifier 3 is configured to send the first identification command to the first identifier 2 when at least one of the color and the vehicle type of the vehicle information contained in the vehicle image is not consistent with the corresponding at least one of the color and the vehicle type in the standard vehicle information of the same license plate number in the vehicle information base, so that the first identifier 2 determines whether the license plate number is tampered.

That is, the second identifier 3 first matches the vehicle information contained in a captured image of a current vehicle to the vehicle information of the same license plate number stored in a history record. When the two are not consistent, it means that the vehicle information is problematic and the license plate of the vehicle is very probable to be a tampered plate. Then, the first identifier 2 further determines whether the license plate number is tampered. When the vehicle information contained in the captured image of the current vehicle is consistent with the vehicle information of the same license plate number stored in the history record, it means that the license plate of the vehicle is less likely to be a tampered plate, and there may be no need to further determine whether it is a tampered license plate. It should be noted that in order to further improve the reliability, even if the vehicle information contained in the captured image of the current vehicle is consistent with the vehicle information of the same license plate number stored in the history record, the first identifier 2 may further be used to determine whether the license plate number is tampered.

The vehicle information may be stored in the vehicle information base in the form of image, i.e., a vehicle image is stored in the vehicle information base. Correspondingly, when determining whether the extracted vehicle information is consistent with the standard vehicle information in the vehicle information base, it may be realized by directly matching the vehicle image to the standard vehicle image in the vehicle information base, i.e., directly matching the images. However, this manner of matching is low in speed and poor in precision.

The vehicle information may also be stored in the vehicle information base in the form of character, i.e., the vehicle information stored in the vehicle information base is text information. Correspondingly, when determining whether the extracted vehicle information is consistent with the standard vehicle information in the vehicle information base, the image obtainer 1 first extracts the vehicle information according to the vehicle image, i.e., obtains and records the vehicle information in the form of text and then sends the vehicle information to the second identifier 3 so that the second identifier 3 matches the vehicle information within the vehicle information base, i.e., directly matches the characters. Directly matching the characters can realize fast and precise matching.

When the vehicle information of the current vehicle is extracted, the vehicle information of the vehicle may also be stored in the vehicle information base for future use.

The vehicle information base may be set up in a cloud server, and the apparatus for identifying license plate tampering may retrieve vehicle information of the same license plate number with the current vehicle from the cloud server to make comparison or matching.

Since the image obtainer 1 is set outdoors, the sharpness of the captured vehicle image is greatly affected by weather and climate. If the sharpness of the vehicle image is insufficient, the subsequent determination of tampered license plates and matching of the vehicle information will be directly affected. Therefore, in order to solve the above problem, the apparatus for identifying license plate tampering of the disclosure further includes an image processor 4 to further process the vehicle image obtained by the image obtainer 1 to meet the extraction requirements. In an exemplary embodiment of the disclosure, the image processor may be implemented as an IC chip such as an image processor or video processor. However, the image processor of the disclosure is not limited thereto, but may also be any other device that can process an image.

In an exemplary embodiment of the disclosure, the image obtainer 1 is further configured to send the vehicle image to the image processor 4 when the vehicle information is unable to be extracted according to the vehicle image. The image processor 4 is configured to sharpen the vehicle image to meet the extraction requirements of the image obtainer 1, and send the sharpened vehicle image to the image obtainer 1 so that the image obtainer 1 extracts vehicle information from the sharpened vehicle image.

The vehicle image may be sharpened with the image processor 4 so that the vehicle image meet the extraction requirements of the vehicle information, thereby guaranteeing an image obtaining effect at different capturing positions and angles, of different illumination intensities and different air qualities so that the current vehicle to be determined is identified and matched more precisely while the error rate is reduced.

As shown in FIG. 1, the apparatus for identifying license plate tampering shown may further comprise a third identifier 5. The image obtainer 1 is further configured to send the license plate number image to the third identifier 5. The third identifier 5 is configured to determine whether the license plate is blocked according to the license plate number image, and send a second identification command to the second identifier 3 when the license plate of the vehicle is determined to be not blocked. The second identifier 3 is further configured to determine whether the vehicle information contained in the vehicle image is consistent with the standard vehicle information in the vehicle information base after receiving the second identification command. In an exemplary embodiment of the disclosure, the third identifier may be implemented as a DSP chip or an embedded chip. However, the third identifier of the disclosure is not limited thereto, but may also be any other device or determining circuit that can determine whether the license plate of the vehicle is blocked.

That is, the third identifier 5 first determines whether the license plate of the vehicle is blocked. When the license plate is determined to be blocked, the vehicle is recorded as a vehicle with a blocked license plate; and when it is determined to be not blocked, the second identifier 3 then determines whether the vehicle information is consistent with the standard vehicle information recorded in the vehicle information base. When the vehicle information is consistent with the standard vehicle information recorded in the vehicle information base, the vehicle is recorded as a normal vehicle; and when the vehicle information is not consistent with the standard vehicle information recorded in the vehicle information base, the first identifier 2 then determines whether the license plate number of the vehicle is tampered. Thus, vehicles with a blocked or tampered license plate, or a normal vehicle can be identified very precisely and fast.

In an exemplary embodiment of the disclosure, the apparatus for identifying license plate tampering may further include an alarm which alarms a worker, such as a traffic policeman, around the vehicle when the first identifier 2 determines that the license plate of the vehicle is tampered. Obviously, the alarm may also alarm a worker, such as a traffic policeman, around the vehicle when the third identifier 5 determines that the license plate of the vehicle is blocked. In an exemplary embodiment of the disclosure, the alarm may be implemented as a DSP chip or an embedded chip. However, the alarm of the disclosure is not limited thereto, but may also be any other device or alarming circuit that can send an alarm message.

Figure 2:
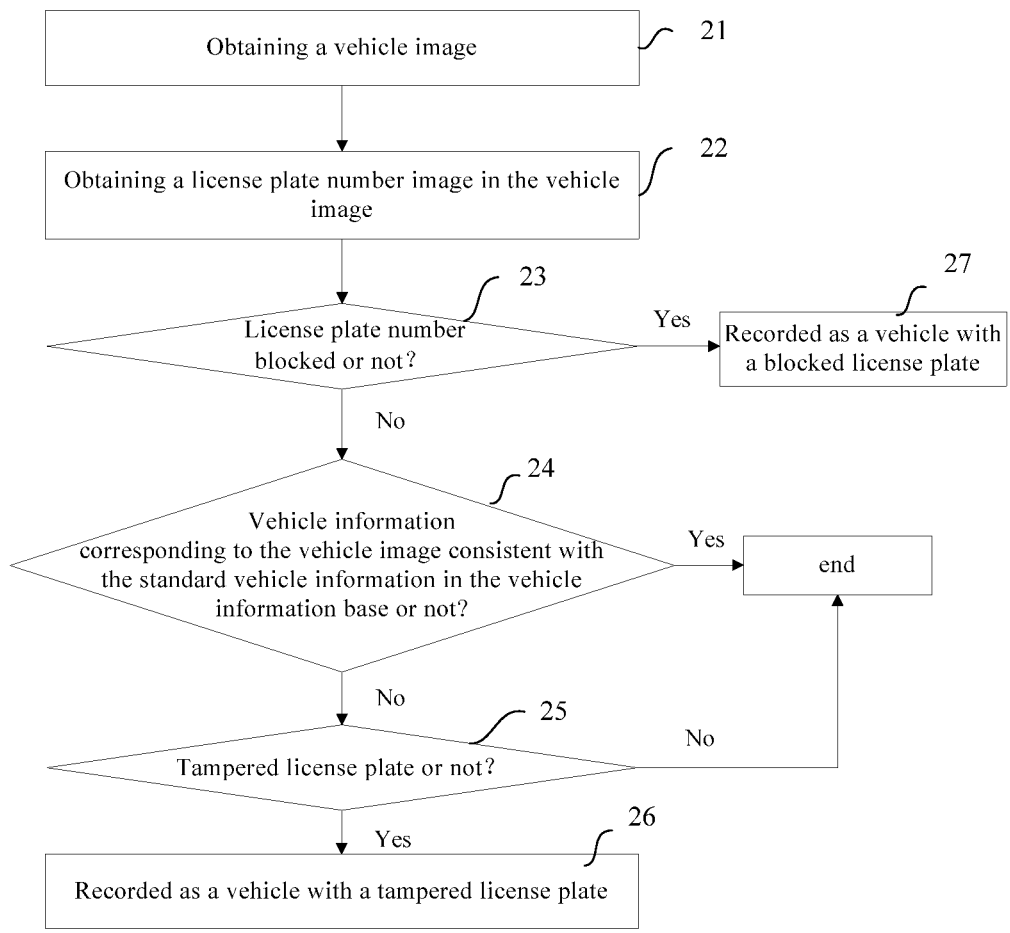
FIG. 2 is a flow chart of the method for identifying license plate tampering according to an exemplary embodiment of the disclosure.

According to another aspect of the disclosure, there is provided a method for identifying license plate tampering which is applied into the above mentioned apparatus for identifying license plate tampering. As shown in FIGS. 1 and 2, the method includes the steps of:

Step 21, obtaining a vehicle image.

Specifically, a camera captures a vehicle image and sends the vehicle image to an image obtainer 1.

Step 22, obtaining a license plate number image in the vehicle image.

Specifically, the image obtainer 1 cuts out the license plate number image automatically from the vehicle image.

Step 23, determining whether the license plate of the vehicle is blocked according to the license plate number image. If the license plate of the vehicle is not blocked, move to step 24; otherwise, move to step 27.

Specifically, the image obtainer 1 sends the license plate number image to the third identifier 5 which determines whether the license plate of the vehicle is blocked according to the license plate number image. If the license plate of the vehicle is not blocked, it is further determined whether the vehicle information is consistent with the standard vehicle information in the vehicle information base (i.e., performing step 24); otherwise, if the license plate of the vehicle is blocked, the vehicle is recorded as a vehicle with a blocked license plate (i.e., performing step 27).

Step 24, determining whether the vehicle information contained in the vehicle image is consistent with the standard vehicle information in the vehicle information base. If not consistent, move to step 25; otherwise, the procedure is ended.

Specifically, the image obtainer 1 extracts the vehicle information according to the vehicle image, and sends the vehicle information and the vehicle image to the second identifier 3. The vehicle information may include a license plate number, a color and a vehicle type. The second identifier 3 determines whether the vehicle information contained in the vehicle image is consistent with the standard vehicle information in the vehicle information base.

If at least one of the color and the vehicle type of the vehicle information contained in the vehicle image is not consistent with the corresponding at least one of the color and the vehicle type in the standard vehicle information of the same license plate number in the vehicle information base, the first identifier 2 further determines whether the license plate of the vehicle is tampered (i.e., performing step 25).

If the color and the vehicle type of the vehicle information contained in the vehicle image are both consistent with the color and the vehicle type in the standard vehicle information of the same license plate number in the vehicle information base, it means that the vehicle is a normal vehicle and the procedure is ended.

It should be noted that the vehicle information may be stored in the vehicle information base in the form of image, i.e., a vehicle image is stored in the vehicle information base. Correspondingly, when determining whether the extracted vehicle information is consistent with the standard vehicle information in the vehicle information base with the second identifier 3, the determination may be realized by directly matching the vehicle image to the standard vehicle image in the vehicle information base, i.e., directly matching the images. However, this manner of matching is low in speed and poor in precision.

The vehicle information may also be stored in the vehicle information base in the form of character, i.e., the vehicle information stored in the vehicle information base is text information. Correspondingly, when determining whether the extracted vehicle information is consistent with the standard vehicle information in the vehicle information base with the second identifier 3, the vehicle information extracted by the image obtainer 1 (i.e., vehicle information in the form of text) is directly matched in the vehicle information base, i.e., directly matches the characters. Directly matching the characters can realize fast and precise matching.

Step 25, determining whether the license plate of the vehicle is tampered according to the license plate number image and the preset standard license plate number image. If it is a tampered license plate, move to step 26; otherwise, the procedure is ended.

Specifically, the image obtainer 1 sends the license plate number image to the first identifier 2. The first identifier 2 divides the license plate number image into different regions according to characters, and compares a color, form and texture of a character in each of the regions with a color, form and texture of a character in the preset standard license plate number image. If at least one of the color, form and texture of the character in any of the regions is different from the corresponding at least one of the color, form and texture of the character in the standard license plate number image, it is determined that the license plate of the vehicle is a tampered plate (i.e., performing step 26); and if all of the color, form and texture of the character in each of the regions are the same with the color, form and texture of the character in the standard license plate number image, it means that the license plate of the vehicle is a normal plate, and thus the procedure is ended.

Step 26, recording the vehicle as a vehicle with a tampered license plate.

Step 27, recording the vehicle as a vehicle with a blocked license plate.

As shown in steps 21-27, by obtaining a vehicle image and then obtaining an license plate number image therein, and determining whether the license plate of the vehicle is tampered according to the license plate number image and a preset standard license plate number image, the apparatus for identifying license plate tampering of the disclosure realizes automatic identification of a tampered license plate number without human laboring, thus saving time and labor, reducing human cost, and further improving precision and reliability in identification of tampered license plates.

It should be noted that, in step 24, if the vehicle information cannot be extracted based on the vehicle image, the method may further include the steps of:

processing the vehicle image by sharpening to meet the extraction requirement, and extracting vehicle information from the processed vehicle image. Specifically, the image processor 4 sharpens the vehicle image.

It should be noted that step 24 may be performed immediately after finishing step 22. Step 25 may be performed when it is determined that the vehicle information contained in the vehicle image is not consistent with the standard vehicle information in the vehicle image information base, or be performed immediately after finishing step 22, i.e., directly determining whether the license plate of the vehicle is tampered.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. An apparatus for identifying license plate tampering, comprising:
    an image obtainer configured to obtain a vehicle image and then obtain and send a license plate number image within the vehicle image; and
    a first identifier configured to receive the license plate number image and determine whether the license plate of the vehicle is tampered according to the received license plate number image and a preset standard license plate number image,
    wherein the first identifier is configured to divide the license plate number image into different regions according to characters, compare a color, form and texture of a character in each of the regions with a color, form and texture of a character in the preset standard license plate number image, determine the license plate of the vehicle to be a tampered plate when at least one of the color, form and texture of the character in any of the regions is different from the corresponding at least one of the color, form and texture of the character in the standard license plate number image, and determine the license plate of the vehicle to be a normal plate when all of the color, form and texture of the character in each of the regions are the same with the color, form and texture of the character in the standard license plate number image.

2. The apparatus according to claim 1, further comprising a second identifier,
    wherein the image obtainer is further configured to send the vehicle image to the second identifier;
    wherein the second identifier is configured to determine whether a vehicle information contained in the vehicle image is consistent with a standard vehicle information in a vehicle information base, and to send a first identification command to the first identifier when the vehicle information contained in the vehicle image is not consistent with the standard vehicle information in the vehicle information base; and
    wherein the first identifier is configured to determine whether the license plate is tampered according to the received license plate number image and the preset standard license plate number image after receiving the first identification command.

3. The apparatus according to claim 2,
    wherein the vehicle information and the standard vehicle information include a license plate number, a color and a vehicle type; and
    wherein the second identifier is configured to send the first identification command to the first identifier when at least one of the color and the vehicle type of the vehicle information contained in the vehicle image is not consistent with the corresponding at least one of the color and the vehicle type in the standard vehicle information of the same license plate number in the vehicle information base.

4. The apparatus according to claim 2,
wherein the vehicle information base stores a standard vehicle image therein, and the second identifier is configured to match the vehicle image to the standard vehicle image in the vehicle information base.

5. The apparatus according to claim 2,
wherein the standard vehicle information in the vehicle information base is text information;
wherein the image obtainer is further configured to extract vehicle information in the form of text contained in the vehicle image according to the vehicle image, and send the vehicle information in the form of text contained in the vehicle image to the second identifier; and
wherein the second identifier is configured to match the vehicle information in the form of text contained in the vehicle image within the vehicle information base.

6. The apparatus according to claim 5, further comprising an image processor,
wherein the image obtainer is further configured to send the vehicle image to the image processor when the vehicle information is unable to be extracted according to the vehicle image; and
wherein the image processor is configured to sharpen the vehicle image, and send the sharpened vehicle image to the image obtainer so that the image obtainer extracts vehicle information from the sharpened vehicle image.

7. The apparatus according to claim 2, further comprising a third identifier,
wherein the image obtainer is further configured to send the license plate number image to the third identifier;
wherein the third identifier is configured to determine whether the license plate is blocked according to the license plate number image, and send a second identification command to the second identifier when the license plate of the vehicle is determined to be not blocked; and
wherein the second identifier is further configured to determine whether the vehicle information contained in the vehicle image is consistent with the standard vehicle information in the vehicle information base after receiving the second identification command.

8. The apparatus according to claim 2, further comprising an alarm,
wherein the alarm alarms a worker around the vehicle when the first identifier determines that the license plate of the vehicle is tampered.

9. A method for identifying license plate tampering, comprising the steps of:
obtaining a vehicle image, and then obtaining a license plate number image in the vehicle image; and
determining whether the license plate of the vehicle is tampered according to the license plate number image and a preset standard license plate number image,
wherein the step of determining whether the license plate of the vehicle is tampered according to the license plate number image and the preset standard license plate number image comprises:
dividing the license plate number image into different regions according to characters; and
comparing a color, form and texture of a character in each of the regions with a color, form and texture of a character in the preset standard license plate number image, determining the license plate of the vehicle to be a tampered plate when at least one of the color, form and texture of the character in any of the regions is different from the corresponding at least one of the color, form and texture of the character in the standard license plate number image, and determining the license plate of the vehicle to be a normal plate when the color, form and texture of the character in each of the regions are the same with the color, form and texture of the character in the standard license plate number image.

10. The method according to claim 9, wherein before the step of determining whether the license plate of the vehicle is tampered according to the license plate number image and the preset standard license plate number image, the method further comprises the step of:
determining whether a vehicle information contained in the vehicle image is consistent with a standard vehicle information in a vehicle information base, and determining whether the license plate of the vehicle is tampered according to the license plate number image and the preset standard license plate number image when the vehicle information contained in the vehicle image is not consistent with the standard vehicle information in the vehicle information base.

11. The method according to claim 10,
wherein the vehicle information and the standard vehicle information include a license plate number, a color and a vehicle type; and
wherein the vehicle information contained in the vehicle image being not consistent with the standard vehicle information in the vehicle information base includes a case where at least one of the color and the vehicle type of the vehicle information contained in the vehicle image is not consistent with the corresponding at least one of the color and the vehicle type in the standard vehicle information of the same license plate number in the vehicle information base.

12. The method according to claim 10,
wherein the vehicle information base stores a standard vehicle image therein, and
wherein determining whether the vehicle information contained in the vehicle image is consistent with the standard vehicle information in the vehicle information base includes matching the vehicle image to the standard vehicle image in the vehicle information base.

13. The method according to claim 10,
wherein the standard vehicle information in the vehicle information base is text information;
wherein after the step of obtaining the license plate number image in the vehicle image, the method further includes extracting vehicle information in the form of text contained in the vehicle image according to the vehicle image, and
wherein the step of determining whether the vehicle information contained in the vehicle image is consistent with the standard vehicle information in the vehicle information base includes matching the vehicle information in the form of text contained in the vehicle image within the vehicle information base.

14. The method according to claim 13, further comprising:
sharpening the vehicle image when vehicle information is unable to be extracted from the vehicle image, and extracting vehicle information from the sharpened vehicle image.

15. The method according to claim 10, after the step of obtaining the license plate number image from the vehicle image and before the step of determining whether the vehicle information contained in the vehicle image is consistent with the standard vehicle information in the vehicle information base, the method further comprises the step of:

determining whether the license plate is blocked according to the license plate number image, and determining whether the vehicle information contained in the vehicle image is consistent with the standard vehicle information in the vehicle information base when the license plate of the vehicle is determined to be not blocked.

16. The method according to claim 10, further comprising:

alarming a worker around the vehicle when the license plate of the vehicle is determined to be tampered.

* * * * *